United States Patent [19]
White et al.

[11] Patent Number: 5,272,569
[45] Date of Patent: Dec. 21, 1993

[54] APPARATUS FOR A FINE ADJUSTMENT FOCUS ACTUATOR IN AN OPTICAL INFORMATION STORAGE SYSTEM

[75] Inventors: David L. White, The Woodlands, Tex.; Paul D. Heppner, Hilton, N.Y.

[73] Assignee: Eastman Kodak Company, Rochester, N.Y.

[21] Appl. No.: 891,129

[22] Filed: Jun. 1, 1992

[51] Int. Cl.$^5$ .............................................. G02B 7/02
[52] U.S. Cl. .................................... 359/814; 359/824; 369/44.16
[58] Field of Search ................ 359/813, 814, 823, 824; 369/44.15, 44.16

[56] References Cited

U.S. PATENT DOCUMENTS

| | | | |
|---|---|---|---|
| 4,472,024 | 9/1984 | Konomura et al. | 359/824 |
| 4,720,185 | 1/1988 | Kurihara | 359/824 |
| 4,734,899 | 3/1988 | Van Sluys | 359/824 |
| 4,840,457 | 6/1989 | Remer | 359/824 |
| 4,882,723 | 11/1989 | Van Rosmalen | 359/824 |
| 5,070,489 | 12/1991 | Perry et al. | 369/44.16 |

*Primary Examiner*—Loha Ben
*Attorney, Agent, or Firm*—William W. Holloway

[57] ABSTRACT

Focusing apparatus is described for a lens holder for an actuator of a read/write head in a optical information storage system which provides a fine adjustment for focussing an optical beam on the storage medium. A lens holder unit is coupled to a base unit by springs, the springs establishing an equilibrium position relative to a base unit. The base unit includes a plurality of coils through which current can flow. The lens holder unit includes a permanent magnet. When current flows through the plurality of coils, a force is exerted on the permanent magnet and, consequently, on the lens holder unit. The position of the lens holder unit relative to the base unit is determined by the magnitude of the current applied to the coils. The springs are arranged to maintain an orientation of the lens assembly unit in space. For small displacements of the lens assembly unit from an equilibrium position, the lens remains proximate the optic axis. A second embodiment of the focus control element provides for a combination of tracking apparatus and focussing apparatus for positioning a focused radiation beam on a storage medium.

6 Claims, 5 Drawing Sheets

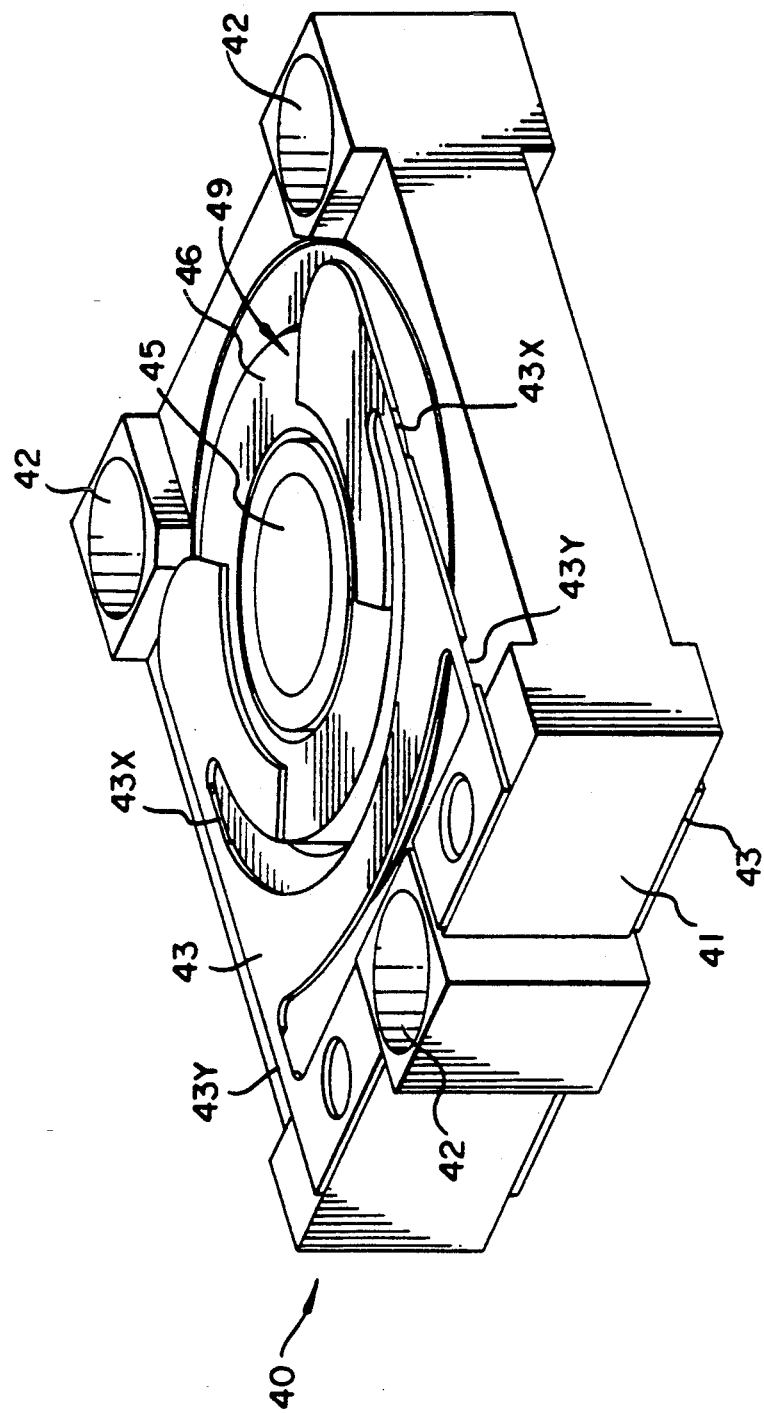

APPARATUS FOR A FINE ADJUSTMENT FOCUS ACTUATOR IN AN OPTICAL INFORMATION STORAGE SYSTEM

BACKGROUND OF THE INVENTION

1. Field of Invention

This invention relates generally to optical information storage systems and, more particularly, to the read/write heads or actuators providing the interaction with the optical information storage medium. The actuator supplies the radiation beam which is applied to the storage medium and/or detects radiation which has interacted with the storage medium. The actuator must insure that the radiation beam accesses (or tracks) the correct region of the storage medium. In addition, the actuator must control the focus of the radiation beam on the optical storage medium.

2. Description of the Related Art

In the optical information storage system, the actuator or read/write head applies a radiation beam to and/or detects a radiation beam that has interacted with the optical storage medium. The actuator, which typically includes an objective lens, can have six degrees of freedom. These degrees of freedom are used to manipulate the applied radiation beam and include three translational degrees of freedom and three rotational degrees of freedom. As will be clear, the rotational degree of freedom about the optic axis, the axis defining the preferred path of the radiation beam, is generally irrelevant. For tracking control, the radiation beam impinging on the storage medium must be controlled in a two dimensional plane for a flat storage medium surface (i.e., in the implementation involving an optical disc, the tracking is typically accomplished by motion along the radius of a disc). For focus adjustment, the distance from a radiation beam focusing component, e.g., an objective lens, to the storage medium must be controlled. A description of the parameters of important in tracking and focussing of an actuator element, are discussed in OPTICAL RECORDING, A Technical Overview by Alan B Marchant, Addison-Wesley Publishing Company, 1990.

As indicated in the Marchant reference, the radiation beam which has interacted with the optical storage media can be processed in such a manner as to yield a signal (or signals) related to focus control and a signal (or signals) related to tracking control. These signals can be used as part of feedback loop to control the location and extent of the interaction of the radiation beam with the storage medium. However, the requirements on the focus and tracking control have diverse operating requirements. As a result of the requirements, both a coarse and a fine adjustment can be required. For example, the tracking control system must not only provide a gross tracking mechanism to position the read/write head over the appropriate track region on the storage medium and over a selected track, but the tracking control system must compensate for any deviation of the track from concentric circle or spiral (relative to the spindle of a disc storage medium). Similarly, not only must the optical read/write head position the objective lens an appropriate distance from the storage medium, but, the focus system must continuously adjust the focus not only for minor departures from a planar surface, but for variations in the thickness of the dielectric layer protecting the storage surface of the medium. Providing the appropriate adjustments for the minor corrections in the focussing and tracking control can be difficult because, in implementing the adjusting movements, the entire inertia of the read/write head must be overcome.

A need has therefore been felt for a technique and associated apparatus for providing fine focus and tracking adjustments for the read/write head of an optical disk of an optical storage and retrieval system which do not require positioning of the entire head.

SUMMARY OF THE INVENTION

The present invention is directed to overcoming one or more of the problems set forth above. Briefly summarized, according to one aspect of the present invention, a fine focussing apparatus is included with the actuator of the optical storage system. The objective lens holder includes a base unit and a lens holder unit for providing the fine focussing apparatus. The lens holder unit is coupled to the base unit by means of two generally planar springs. The position of the lens is determined by the force of the springs acting against a magnetic force, the magnetic force acting to provide the focus adjustment for the lens by positioning the lens holder unit. The magnetic force is provided by the interaction of a permanent magnetic coupled to the objective lens holder unit and current through coils coupled to a base unit of the actuator. The springs are adapted to constrain the motion of the lens generally parallel to the optic axis of the read/write head. According to another aspect of the invention, fine focus and tracking positioning are provided for the objective lens holder unit of the read/write head. The fine focus and tracking apparatus includes a cylindrical permanent magnet as part of the lens holder unit and two sets of coils associated with the base unit. One of the sets of coils interacts with the permanent magnet to provide a vertical force which can be used in the implementation of the focus control facility. The remaining set of coils is symmetrically positioned with respect to the cylindrically shaped permanent magnet. By equal and opposite activation of the two coils, a lateral force can be exerted on the lens holder unit while the net vertical force is zero. The lateral force can be used to implement a tracking control facility.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2A is a side, cross-sectional view of the geometry of the magnetic regions of lens holder and the orientation of the resulting magnetic fields, while

FIG. 4 is a perspective view of the preferred embodiment of the objective lens holder of the actuator of the present invention.

FIG. 6A is an exploded view of the springs coupling the base unit and the lens holder unit of the actuator, while

DESCRIPTION OF THE PREFERRED EMBODIMENTS

1. Detailed Description of the Figures

Figure 1:
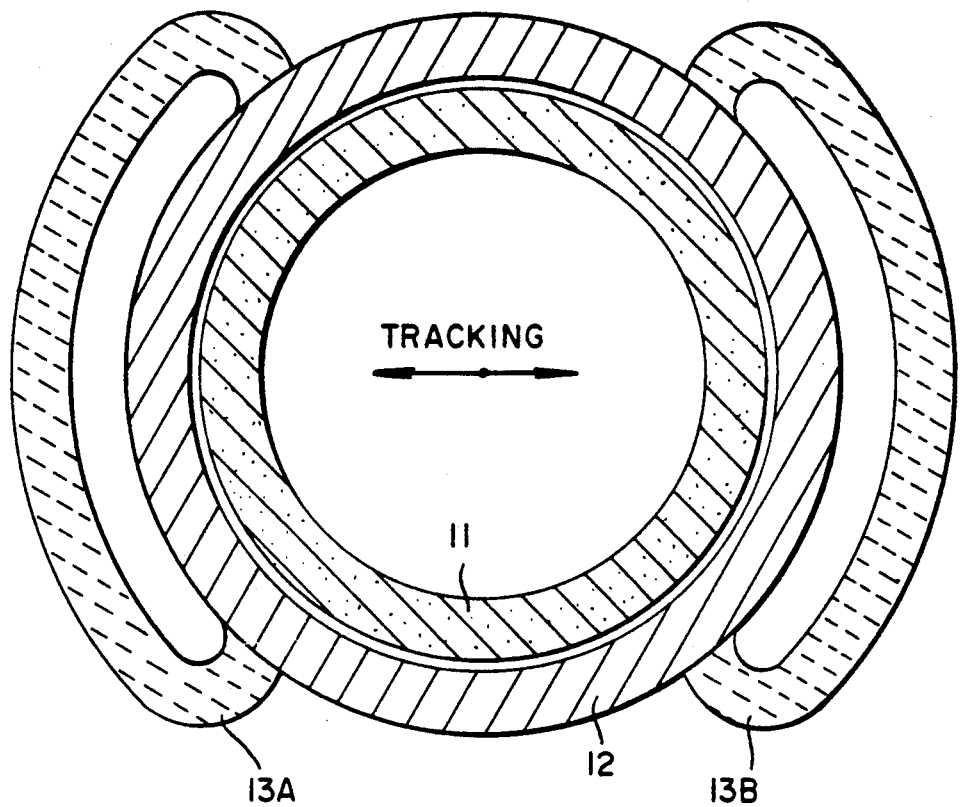
FIG. 1 is a top, cross-sectional view of the geometry of the regions resulting in magnetic interaction between the base unit and the lens holder unit of the actuator lens holder according to the present invention.
Figure 2A:
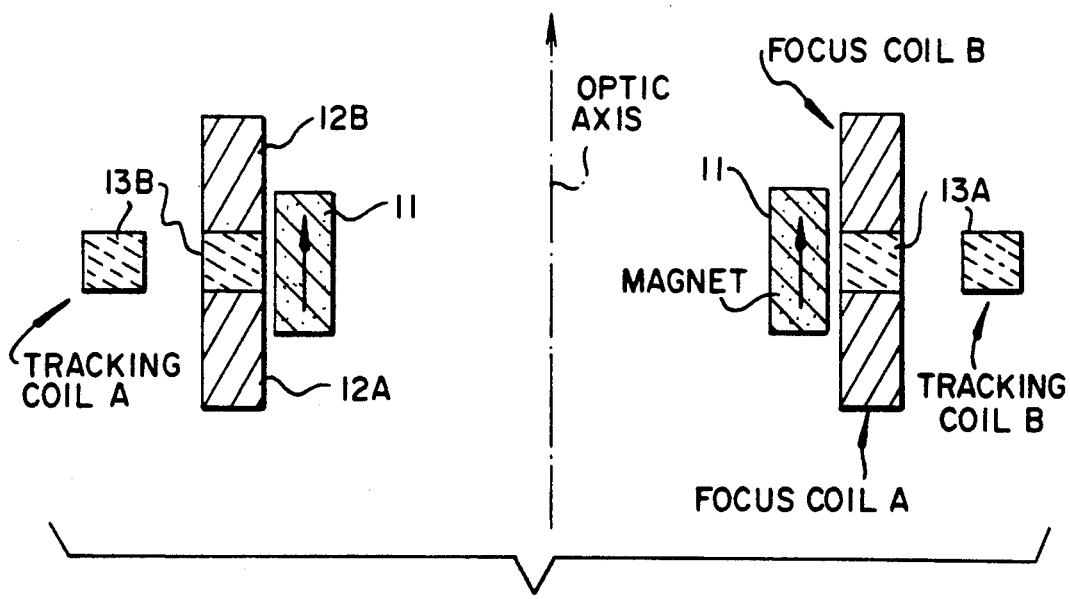

Referring now to FIG. 1 and FIG. 2A, three distinct portions of the actuator lens holder which participate in the magnetic field interactions relevant to the focus and tracking control are shown. Annularly-shaped permanent magnet 11 has an axis of symmetry generally coincident with the optic axis of the actuator lens holder. The permanent magnet 11 is coupled to the lens holder unit while the remaining portions 13A, 13B, 12A, and 12B are coupled to the base unit. Two annularly-shaped coils 12A and 12B, also centered about the optic axis, have a larger radius than the permanent magnet 11, are separated from each other, and extend above and below the permanent magnet 11. Two handle-shaped coils 13A and 13B have portions positioned between coils 12A and 12B and complete the coil enclosure with an extension beyond opposite sides of the actuator.

Figure 2B:
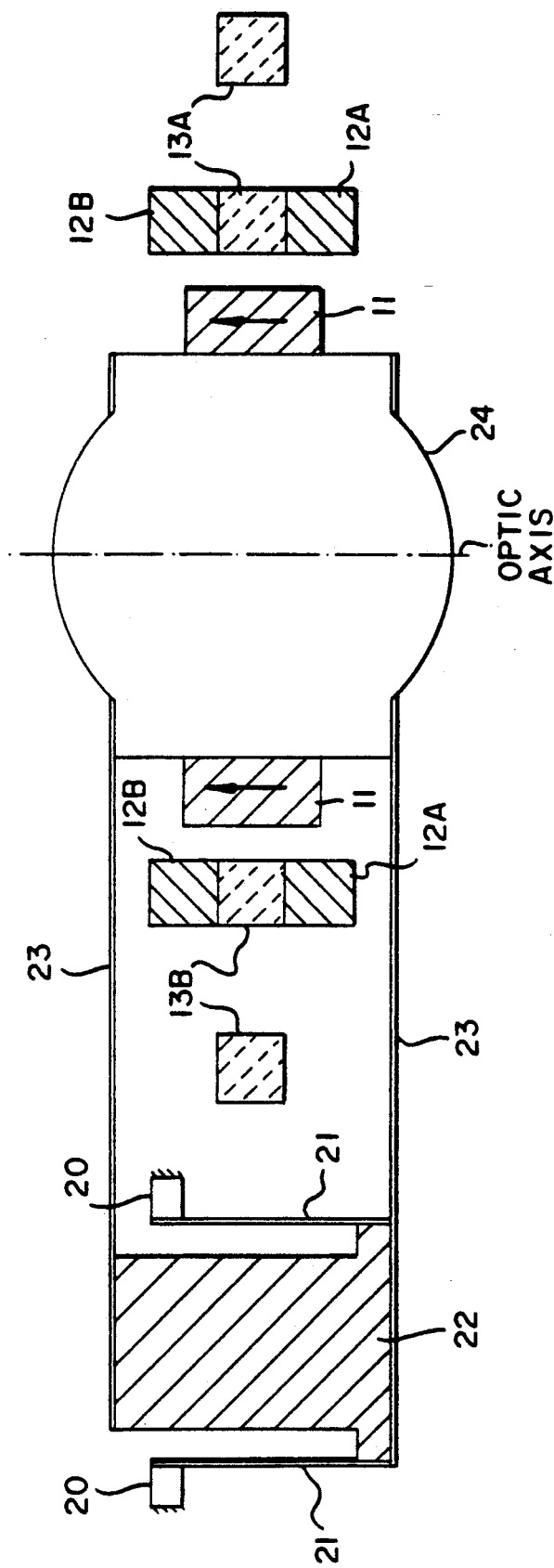
FIG. 2B illustrates how the lens holder unit can be coupled to the base unit of the optical head.

Referring to FIG. 2B, a lens holder capable of utilizing two sets of (magnetically-induced) forces to provide tracking and focussing positioning are shown. The base unit 20 is coupled to an intermediate body 22 by a set of springs 21. The intermediate body 22 is coupled to a lens holder 24 by a set of springs 23. The annularly shaped permanent magnet 11 is coupled to the lens holder 24. The remaining magnetic coils, 12A and 12B, and 13A and 13B are coupled to the base unit 20. The springs 21 limit the motion in the tracking direction and provide a restoring force to limit the motion resulting from the tracking magnetic force. The springs 23 provide a focussing motion of the lens holder to a motion orthogonal to the tracking motion and provide a restoring force to limit the motion resulting from the focussing magnetic force.

Figure 3:
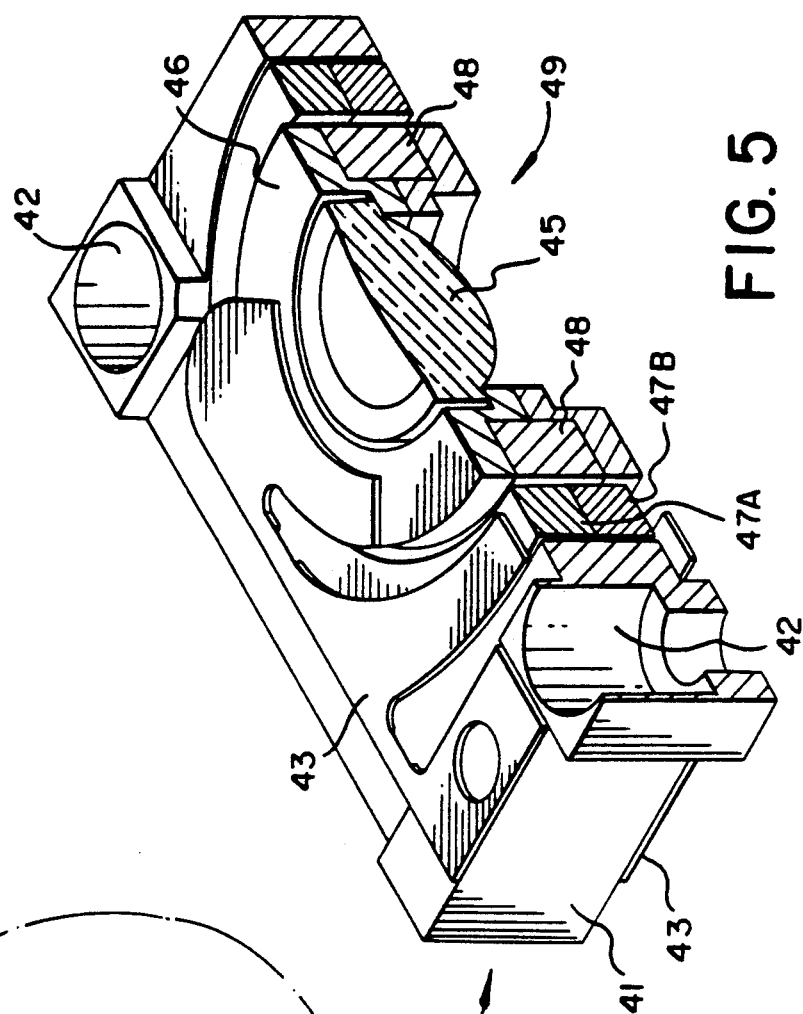
FIG. 3 is a side, cross-sectional view, of a portion of the lens holder shown in FIG. 2 illustrating the orientation of the magnetic fields originating from the permanent magnet and activated coils.

Referring to FIG. 3, constant magnetic flux lines are shown for the indicated magnetic orientation of the permanent magnet 11. The current through coil 12A is in a direction into the plane of the drawing and the current through coil 12B is in a direction out of the plane of the drawing. The inner portion of the coil 13A has current flowing into the plane of the drawing, while the outer portion of the coil has current flowing out of the plane of the drawing. The lines of constant magnetic flux are shown by the dotted lines.

Referring next to FIG. 4, a perspective view of the lens holder of an actuator according to the preferred embodiment is shown. The lens holder 40 of the actuator includes a focus adjustment, i.e., in which the position of the objective lens relative to the recording medium can be controlled. The base unit 41 of the lens holder 40 includes fastener apertures 42 into which coupling units can be entered to secure lens holder 40 to the remainder of the actuator. Spacers 46 secure the lens 45 in the lens holder unit 49. The spacers 46 and lens 45 forming the lens holder unit 49 are coupled to base 41 by means of springs 43. Springs 43 include regions 43X and 43Y, the function of which will be discussed in detail below.

Figure 5:
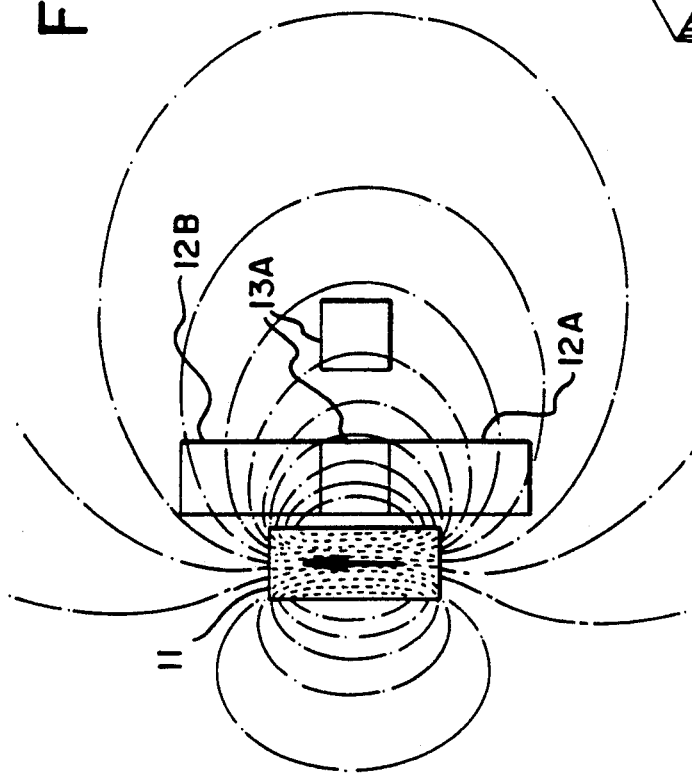
FIG. 5 is a cutaway perspective view of the objective lens holder of the actuator of FIG. 4.

Referring next to FIG. 5, a cross-sectional view of the lens holder of FIG. 4 is shown. The base 41, which includes the apertures 42 fabricated therein, has two sets of coils 47A and 47B coupled thereto. The spacers 46 which are coupled to the lens 45 are also coupled to a permanent magnet 48. The spacers 46, the lens 45, and the permanent magnet 48 form a lens holder unit 49, the lens holder unit 49 being coupled to the base unit 41 by means of springs 43. The springs 43 establish an equilibrium position for the lens assembly 45. An externally applied force will result in movement of the lens assembly 45 relative to the lens holder 40 and, consequently, relative to the storage media.

Figure 6A:
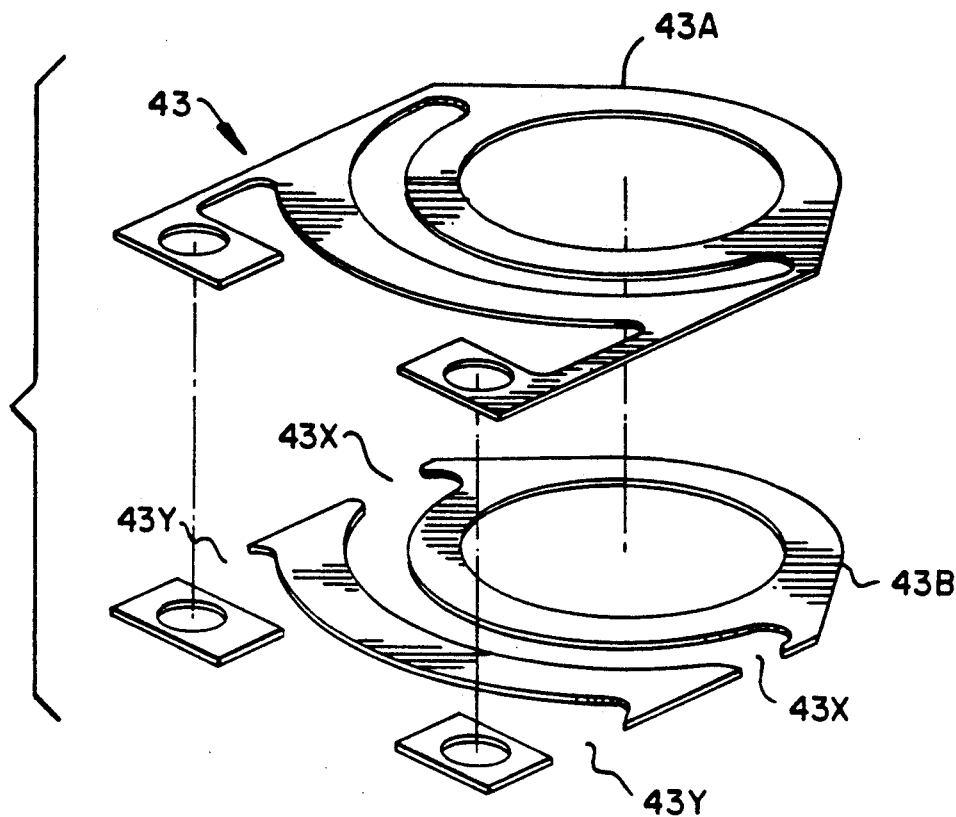
Figure 6B:
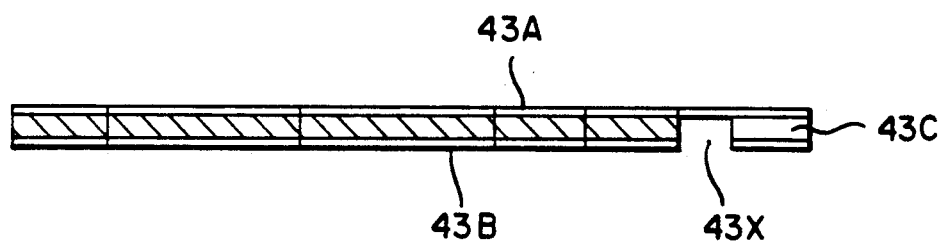
FIG. 6B is a cross-sectional view of these springs.

Referring to FIG. 6A and FIG. 6B, a detailed diagram of the construction of springs 43. The springs 43 include a top portion 43A and a bottom portion 43B which are bound together with an epoxy adhesive layer 43C. In four regions, 43X and 43Y, the spring consists of only top portion 43A. Those regions of 43A have relatively little area, thereby limiting the flexure of the spring to that region.

2. Operation of the Preferred Embodiment

Referring once again to FIGS. 1–3, the actuator has one magnet and four coils used in the positioning of the objective lens. Two of the coils, focus coil 12A and focus coil 12B are used to generate focus forces, i.e. forces (on the permanent magnet 11) which result in a net force parallel to the optic axis. When the current flows clockwise in one coil, current flows counter clockwise in the second coil. Because of the reversal of the current in each in conjunction with the opposite polarities of the permanent magnet, the force on the magnet will be additive. When a force in the opposite direction is desired, the current in each coil (12A and 12B) can be reversed. Coils 13A and 13B provide a lateral force, i.e., a force perpendicular to the optic axis. The current in one coil of the coils, 13A and 13B, flows clockwise while the current in the second coil flows counter clockwise. As will be clear, particularly from FIG. 3, the force resulting from the interaction of the magnetic field from the permanent magnet on the current flowing through the inner portion of coil 13A will be stronger than the interaction of the magnetic field of the permanent magnet on the current flowing through the outer portion of the coil 13A. As a result, a net lateral force will be exerted on the permanent magnet 11 and the associated objective lens. With respect to the coil on the opposite side of the lens holder, because the current in the coil 13B is circulating with the opposite angular sign, the force on the inner portion of the coil resulting from the magnetic field of the permanent magnet will be in the same direction as the force on the other coil, resulting in a net lateral force as a result of the forces on both coils 13A and 13B. Because the coils 13A and 13B are symmetric and carry equal current with opposite orientations, any vertical force on one of the coils on permanent magnet 11 will be cancelled by a vertical force in the opposite direction from the second coil. The springs 21 constrain a movement in the tracking direction, i.e., in a horizontal direction in the plane of FIG. 2B. As will be described with reference to FIGS. 6A and 6B, the set of springs 21 can be implemented to maintain the spatial orientation of the intermediate body 22. Similarly, the set of springs 23 can be implemented to constrain the focussing motion of lens holder 24 in a vertial direction in the plane of FIG. 2B and maintains the spatial orientation of the lens holder relative to the intermediate body 22. The set of springs 23 constrains the lens holder, for small excursions from equilibrium, to move in a focusing motion orthogonal to the movement of the intermediate body (executing a tracking motion contrained by the set of springs 21). Thus, the tracking movement of the lens holder (through the intermediate body) and the focussing motion of the lens holder are independent and the spatial orientation of the lens holder is maintained during the tracking and the focussing motion.

Referring next to FIGS. 4-6B, a lens holder unit and a base unit form a lens holder which can provide a lens positioning for an objective lens relative to a surface upon which a radiation beam is directed. When the two springs of FIGS. 6A and 6B are employed as shown in FIG. 4 and FIG. 5, the spatial orientation of the lens during positioning of the lens in a focussing procedure is maintained. As will be clear, the trajectory of a lens is an arc. However, for small displacements from the neutral position of the springs, the path of the lens will be approximately along the optic axis.

It will be now appreciated that there has been presented apparatus and a technique for providing fine focussing adjustment of an objective lens in an actuator of an optical information storage system. According to a second embodiment of the invention, fine tracking and fine focussing adjustment can be included in an objective lens holder. The feedback control elements which identify the need for either a focussing adjustment or a tracking adjustment and the feedback control elements which provide the current to the coils to respond to the identified need have not been described. These feedback control elements are known in the related art and, for example, are described in the Marchant reference cited above.

While the invention has been described with reference to optical information storage systems, it is apparent that the invention is easily adapted to other devices that require a continually available fine focussing for a radiation beam on a surface.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An actuator unit for an optical information storage system, said actuator unit providing focusing adjustment for a lens relative to a storage medium, said actuator unit comprising:
   a lens holder unit, said lens holder unit including a lens and a permanent magnet positioned with cylindrical symmetry;
   a base unit establishing a position relative to a storage medium of said storage system, said base unit including at least one coil, said coil being symmetric with respect to an optic axis of said actuator unit; and
   a plurality of springs coupling said lens holder unit to said base unit, said lens being positioned along said optic axis and said permanent magnet being positioned symmetrically with respect to said optic axis, wherein a current through said at least one coil determines a position of said lens holder unit relative to said base unit, said springs generally maintaining a spatial orientation of said lens wherein each of said springs includes at least one selected region for providing a major flexure amount.

2. The actuator of claim 1 wherein said at least one coil includes at least two coils, wherein a first of said two coils is disposed above said permanent magnet and a second coil disposed below said permanent magnet, wherein a current flowing through each coil has a different polarity for interacting with the two poles of said permanent magnet to provide additive forces.

3. An actuator for a read/write head of an optical information storage and retrieval system, said read/write head including a detector unit for providing focus control signal and tracking control signal, said tracking control signals determining a position of said actuator relative to an optical information storage medium, said actuator including a lens holder characterized by:
   a base unit including at least one coil having a current flowing therethrough, a magnitude of said current being determined by at least a portion of said focus control signal;
   a lens holder unit capable of motion relative to said base unit, said lens holder unit including a lens and a permanent magnet, said permanent magnet interacting with said current flowing through said at least one coil to provide a magnetic force on said lens holder unit; and
   spring unit for coupling said base unit and said lens holder unit, said spring unit preserving spatial orientation of said lens holder unit during relative motion between said lens holder unit and said base unit resulting from said magnetic force, wherein said spring unit includes a first and a second planar spring, each spring including a first and a second region for locating a flexure of said each spring.

4. A lens holder for an actuator of a read/write head in an optical storage system, said lens unit comprising:
   a lens holder unit, said lens holder unit including a lens and a permanent magnet;
   a base unit for establishing a position of said lens holder unit relative to a storage medium of said optical storage system, said base unit including a first and a second coil means, wherein current through said first coil means provides a first force on said permanent magnet generally parallel to an optic axis, wherein current through said second coil means provides a force on said permanent magnet generally perpendicular to said optic axis, wherein said first coil means includes an upper coil generally positioned above said permanent magnet and a lower coil generally positioned below said permanent magnet.

5. The lens holder of claim 4 wherein said second coil means includes a first side coil positioned on a first side of said base unit in a plane generally parallel to said permanent magnet and a second side coil generally positioned symmetrically to said first coil on an opposite side of said base unit.

6. The lens holder of claim 5 further comprising:

an intermediate body;

a first spring set coupled between said base unit and said intermediate body; said spring set constraining said intermediate body to move in a tracking direction, said first spring set acting to restore said intermediate body to an equilibrium position in opposition to said second force; and a second spring set coupled between said lens holder unit and said intermediate body, said second spring set constraining said lens holder unit to move in a focussing motion, said second spring set acting to restore said lens holder unit to an equilibrium position in an absence of said first force.

* * * * *